US006360208B1

(12) United States Patent
Ohanian et al.

(10) Patent No.: US 6,360,208 B1
(45) Date of Patent: Mar. 19, 2002

(54) METHOD AND APPARATUS FOR AUTOMATIC TAX VERIFICATION

(75) Inventors: Michael Ohanian, Everett; Paul A. Maltseff, Edmonds, both of WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/244,611

(22) Filed: Feb. 4, 1999

(51) Int. Cl.[7] .............................................. G06F 17/60

(52) U.S. Cl. ................. 705/31; 705/1; 705/28

(58) Field of Search .......................................... 705/31

(56) References Cited

U.S. PATENT DOCUMENTS

| | | | |
|---|---|---|---|
| 5,160,023 A | * 11/1992 | Adams et al. | 206/256 |
| 5,521,815 A | * 5/1996 | Rose, Jr. | 364/409 |
| 5,788,796 A | * 8/1998 | Look et al. | 156/277 |
| 5,805,082 A | * 9/1998 | Hassett | 340/928 |
| 5,874,896 A | * 2/1999 | Lowe et al. | 340/572 |
| 6,025,784 A | * 2/2000 | Mish | 340/693.5 |
| 6,076,064 A | * 6/2000 | Rose, Jr. | 705/1 |
| 6,097,301 A | * 8/2000 | Tuttle | 340/693.9 |

OTHER PUBLICATIONS

Businessworld, Cigarette firms complain barcode requirement is 'too costly', Nov. 1998.*

Material Handling Engineering, Going with the flow: The 1998 rountable report, Dec. 1998.*

* cited by examiner

Primary Examiner—Christopher P. Ellis
Assistant Examiner—Gene O. Crawford
(74) Attorney, Agent, or Firm—Seed IP Law Group, PLLC (57) ABSTRACT

A method for tracking tax payment information includes fixing a unique machine readable identifier to each of a number of taxable items, storing each of the unique machine readable identifiers in a computer readable memory, and storing tax payment information in the computer readable memory for each of the items. The unique machine readable identifier may take the form of a machine readable symbol such as a barcode symbol or as a wireless memory device such as a radio frequency identification ("RFID") tag. The tax information may include data such as the tax payment status, tax payment authority, a tax payment sum, a tax payment date, identify of a manufacturer, identify of a product or product type, and the identify of a product origin. Tax payment information may include tax payment information from multiple taxing authorities. The method may further include reading the unique machine readable identifier and retrieving the tax payment information based on the identifier to verify that the appropriate taxes have been paid. The computer readable memory may be a centralized database, may be located in a reading device being used to verify compliance, or be located in the RFID tag secured to the taxed good.

20 Claims, 8 Drawing Sheets

METHOD AND APPARATUS FOR AUTOMATIC TAX VERIFICATION

TECHNICAL FIELD

This invention relates to a tracking of taxes payable on certain items or the sale of certain items, and more particularly to an automated method and apparatus for tracking such taxes.

BACKGROUND OF THE INVENTION

A number of taxing authorities, such as federal, state, county and cities, impose taxes on items or the sale of items to raise revenues and/or control the consumption of the item. These taxes are often applied in the form of sales tax, excise tax and duties. The taxes are typically applied to high value items, such as, chocolate, perfumes, automobiles and boats, or to items the authority wishes to limit the consumption of, such as cigarettes and other tobacco products, alcohol, and fossil fuels. In many instances, a taxing authority will issue a tax stamp that is applied to the item to demonstrate compliance with the taxing laws. For instance, tax stamps are routinely found on cigarette packages and bottles of hard spirits. These tax stamps are typically applied across the cover of the package such that the tax stamp must be destroyed when the package is opened, thereby preventing the package from being refilled.

In some instances, multiple taxing authorities may apply taxes to the same item. For example, a federal tax and a state tax may both be applied to the sale of cigarettes. In many instances, these taxes substantially raise the cost of the goods to consumers providing an incentive for the sale of black market goods. The sale of black market goods causes loss of revenues to these taxing authorities and may circumvent certain public policies designed to discourage the consumption of the taxed goods.

While tax stamps have been used for centuries, they provide little information regarding the goods and the tax paid. For example, the tax stamp does not identify the manufacturer of the goods or the specific good being sold. The tax stamp may also fail to identify the amount of tax paid or the date of tax payment. While a tax stamp typically identifies the taxing authority who received the taxes, there is rarely sufficient room on the goods for more than one tax stamp. For example, there is little room over a cap of a bottle of hard spirits for more than one tax stamp. Further, the advent of high quality color copying machines has made forgery easier, allowing the mass duplication of a single tax stamp.

The current method employing tax stamps does not permit the automatic collection and compliance verification. If tax information is even collected, it is typically collected on forms for eventual entry into a computer system. The information is often out-of-date, and is often incorrect due to transcribing errors. This hinders taxing authorities in collecting tax revenues and tax related information, and interferes with the enforcement of tax laws.

SUMMARY OF THE INVENTION

In one aspect of the invention, a method for tracking tax payment information includes fixing a unique machine readable identifier to each of a number of taxable items, storing each of the unique machine readable identifiers in a computer readable memory, and storing tax payment information in the computer readable memory for each of the taxable items. The unique machine readable identifier may take the form of a machine readable symbol such as a barcode symbol or as a wireless memory device such as a radio frequency identification ("RFID") tag. The tax information may include data such as the tax payment status, tax payment authority, a tax payment sum, a tax payment date, identity of a manufacturer, identity of a product or product type, and the identity of a product origin. Tax payment information may include tax payment information from multiple taxing authorities.

The method of tracking tax payment information may further include reading the unique machine readable identifier from one of the taxable items and retrieving the tax payment information from the computer readable memory to verify that the appropriate taxes have been paid to the appropriate taxing authorities for the given taxable item. Reading the identifier may take the form of imaging and decoding a machine readable symbol or interrogating a wireless memory device.

The computer readable memory may be a central database, for example, located at the taxing authority. The computer readable memory may, alternatively, be located in a reading device being used to verify compliance, the information being routinely downloaded to the reading device. The reading device may take the form of a portable, hand held barcode scanner or RFID tag interrogator. Alternatively, the computer readable memory may be located in one or more RFID tags secured to the taxable goods.

Encryption of the tax payment information may provide security for the data and may deter forgery. Encryption may be particularly suitable where the tax information is stored in a machine readable symbol or wireless memory device. The wireless memory device and/or the computer readable memory may require an access code to read from or write to the memory.

In the case of a wireless memory device, the unique identifier or serial number may be permanently stored in the device. The device may allow updating of the tax information. For example, the wireless memory device may be updated each time a tax is paid to a taxing authority.

In another aspect of the invention, a printer for printing tax verification labels or "smart" tax stamps includes a print head movably positionable with respect to a print media and a controller coupled to the print head to cause the print head to print a number of machine readable symbols each encoding a unique identifier on the print media. In yet another aspect of the invention, a point of sale device comprises a reader selectively operable to read a unique identifier from an item, a user input device operable to input text information and a communications link to couple the reader and the user input device to transmit the identifier and associated tax information to a computer readable memory.

In yet another aspect, the tax verification device comprises a reader selectively operable to read a unique identifier from an item and a communications link selectively operable to transmit the read unique identifier from the device and to receive tax information based on the unique identifier.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with machine readable symbols, wireless memory devices, readers, interrogators, communications links and databases have not been shown or described in detail to avoid unnecessarily obscuring the description of the embodiments of the invention.

Figure 1:
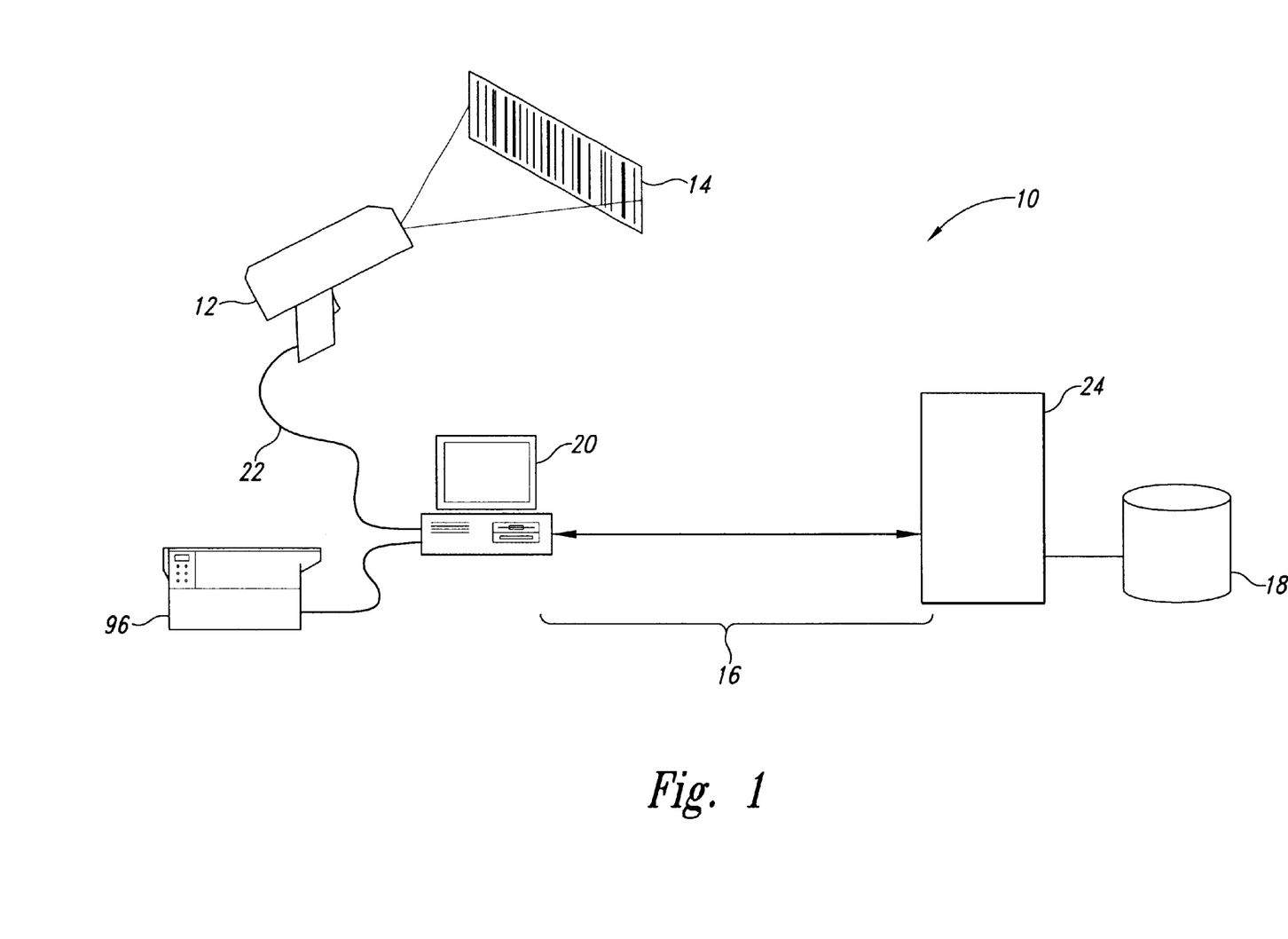
FIG. 1 is a schematic diagram of a tax verification system including an optical scanner for reading a machine readable symbol, and a communications link to a tax verification database.

With reference to FIG. 1, a tax verification system 10 is shown for maintaining tax information and verifying compliance with taxing laws and regulations. The system 10 includes a reader 12 for reading a unique machine readable identifier encoded in a machine readable symbol, such as the barcode symbol 14. Of course, the unique machine readable identifier may be encoded in an two-dimensional machine readable symbol selected from an area code symbology, such as Code 49 or Code 1. Area code symbologies typically permit to symbol to carry more information per unit area. The reader 12 may take the form of any of a number of conventional symbol readers, that typically image or scan the symbol 14 to produce a digital representation and that decodes the digital representation to determine the data encoded in the symbol 14. Such symbol readers are well known in the art and will thus not be further discussed.

A communications link 16 couples the reader 12 to a central database 18 of tax information. In the embodiment shown, the reader 12 initially downloads the unique identifier to a personal computer 20. The communication link 16 may comprise a physical coupling such as a network or cable 22, or an intermediate computer. Alternatively, the reader 12 may download the unique identifier to the personal computer 20 by way of a wireless link such as a radio frequency ("RF") link or an infrared ("IR") link.

The personal computer 20 may control a printer 96 having a conventional printhead and printhead controller for printing tags or tax stamps bearing the bar code symbol 14. The printer 96 may, for example, take the form of a thermal printer having a thermal printhead. The tags may include a pressure sensitive adhesive and release liner.

A central computer 24 provides access to the database 18. The central computer 24 may take the form of a personal computer, mini-computer or mainframe computer. Communications between the personal central computer 20 and the computer 24 may take any of a variety of forms such as the Internet or World Wide Web, a dial-up telephone line, or a satellite communications link.

Figure 2:
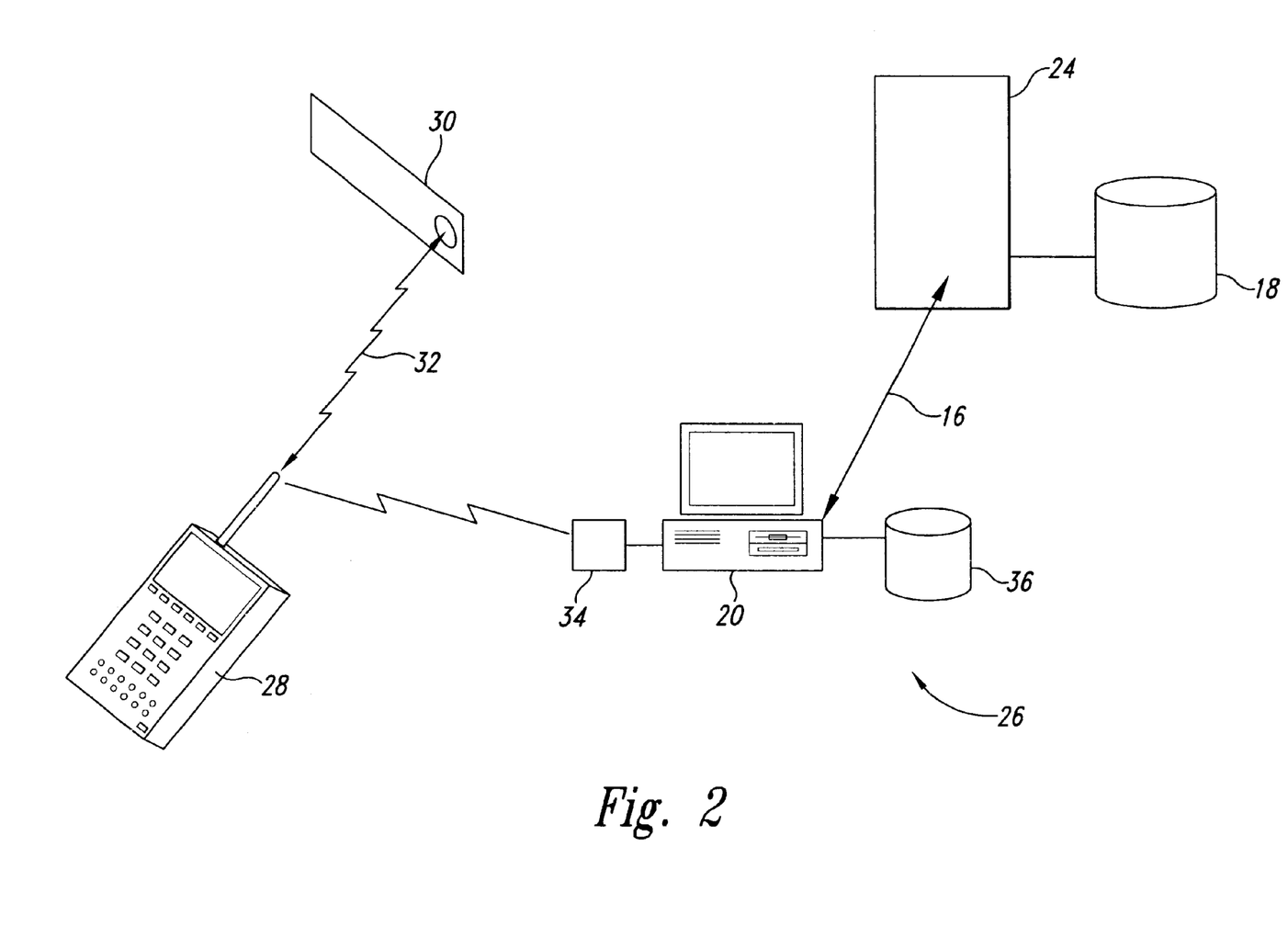
FIG. 2 is a schematic diagram showing a wireless interrogator for reading an RFID tag, an RF data link to a first database of tax information and a communications link to a second database of tax verification information.

FIG. 2 shows an alternative exemplary embodiment of a system for maintaining tax information and verifying tax compliance 26.

As shown in FIG. 2, the alternative embodiment employs devices similar to the devices in FIG. 1. This alternative embodiment, and those described herein are substantially similar to previously described embodiments, and common steps and structure are identified by the same reference numbers. Only the significant differences are described in detail.

The system 26 includes a wireless interrogator 28 for interrogating a wireless memory device such as an RFID tag 30. The RFID tag 30 may be an active device containing its own power source, or may be a passive device, relying on the RF interrogation beam 32 for power. The structure and method of operating RF tags is generally known, and the reader is referred to the discussion in U.S. application Ser. No. 09/050,623, filed Mar. 30, 1998, and commonly assigned to the assignee of this application for further details concerning RFID tags. The RFID tag 30 stores a unique identifier and may store additional tax related information. The RFID tag 30 may be programmable, allowing the tax information to be updated. Information in the RFID tag 30 may be encrypted using standard encryption techniques such as private-public key techniques, to provide security for the data. Encrypting the tax related information may take place on a secure computer, for example the central computer 24, were adequate security measures may be provided by the taxing authority operating the secure computer. Additionally, the RFID tag 30 may require a read access code to permit a user to read data stored in the RFID tag 30, and may require a write access code to allow a user to write to or reprogram the data in the RFID tag 30.

A radio frequency transceiver 34 provides an interface between the wireless interrogator 28 and the personal computer 20. The communications link 16 provides communications between the personal computer 20, the central computer 24, and the central tax information database 18. The personal computer 20 couples an intermediate tax information database 36 to the system 26 to provide temporary storage for tax information. Thus, tax information collected by the interrogator 28 may be downloaded to the intermediate database 36 for periodic uploading from the intermediate database 36 to the central tax information database 18. Similarly, information collected from a number of sources such as a number of wireless interrogators 28 may be accumulated in the central tax information database 18 and periodically downloaded to the intermediate database 36.

Figure 3:
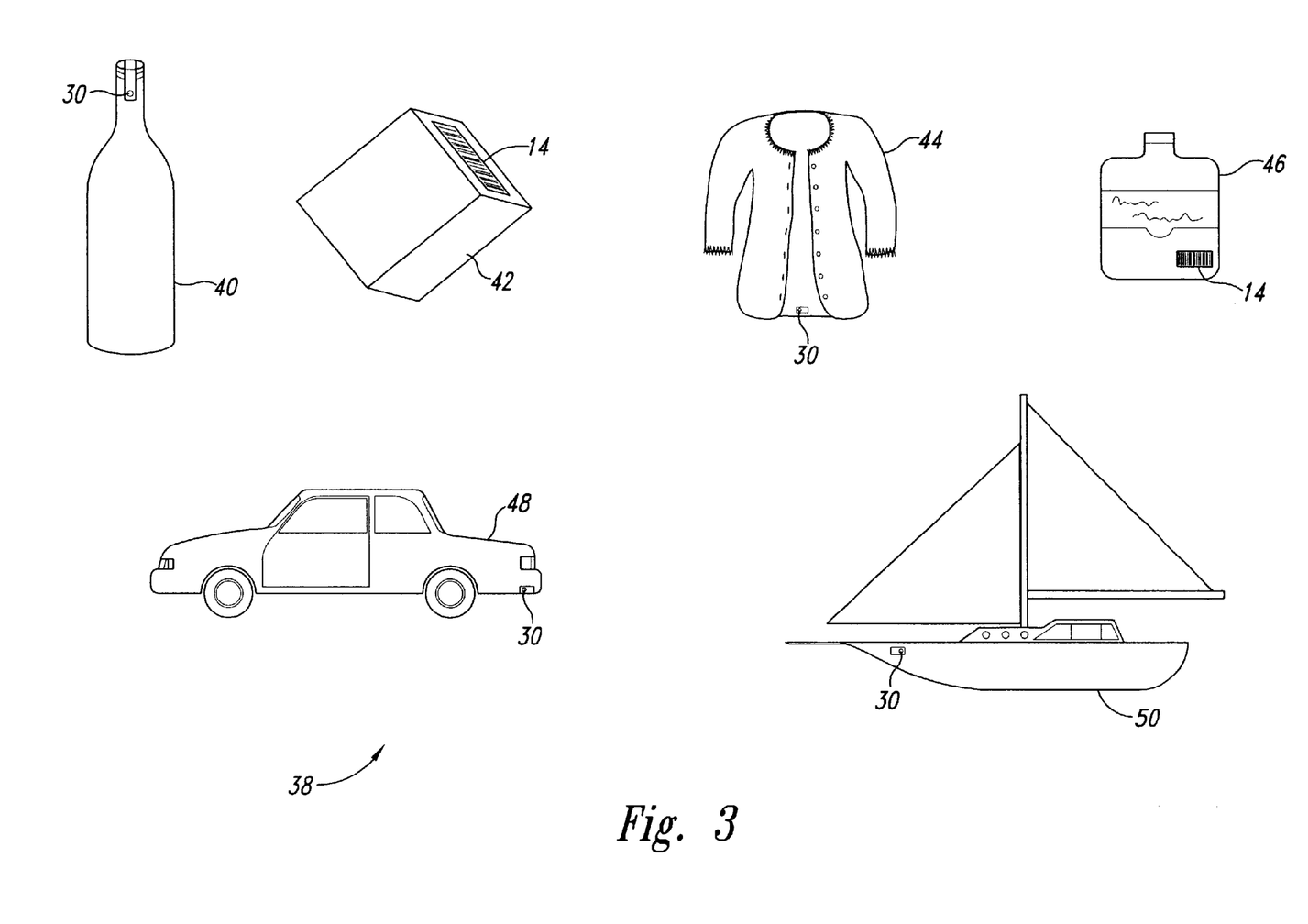
FIG. 3 is a schematic diagram showing a number of high value items bearing unique tax identifiers.

FIG. 3 shows a number of taxable items or taxable goods 38. For example, the goods may include a bottle of distilled spirits 40, a package of cigarettes 42, an article of clothing such as a fur coat 44, a bottle of perfume 46, an automobile 48 or a yacht 50. In each case a machine readable symbol 14 or RFID tag 30 is secured to the taxable good 38. In some instances, for example the bottle of distilled spirits 40 and the package of cigarettes 42, the RFID tag 30 or machine readable symbol 14 covers the opening of the packaging. This ensures the destruction of the RFID tag 30 or machine readable symbol 14 upon the opening of the bottle 40 or package 42. Destruction of the RFID tag 30 or machine readable symbol 14 prevents the packaging from being refilled in an attempt to avoid payment of the appropriate taxes.

While the RFID tag 30 and machine readable symbol 14 are shown for convenience fixed to visible surfaces of the fur coat 44, automobile 48 and yacht 50, these tags 30, 14 may be secured to non-visible surfaces of the goods 38. For example, the RFID tag 30 may be sewn within the lining of the fur coat 44. Also for example, the RFID tag 30 may be secured on the interior of a body panel of the automobile 48 or within the hull of the yacht 50. Hiding the RFID tag 30 deters tampering or swapping of the RFID tag 30 by individuals attempting to avoid tax payments.

Figure 4:
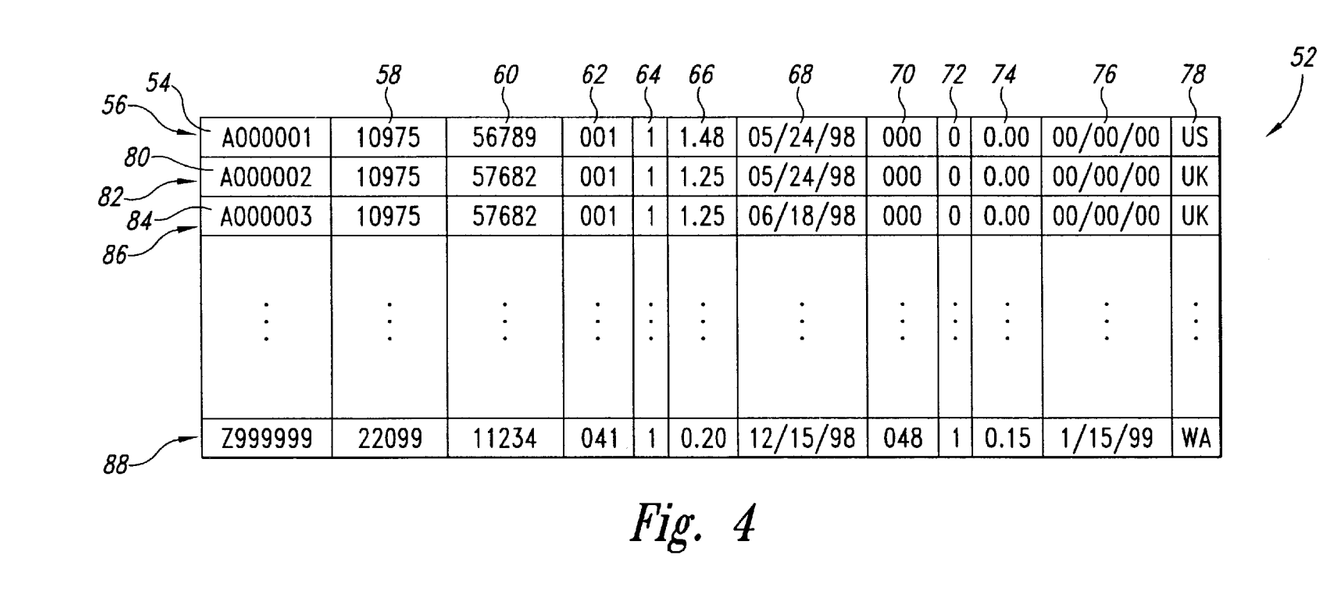
FIG. 4 is a schematic diagram showing a schema for a tax verification database.

FIG. 4 shows an exemplary embodiment of a database schema for the tax verification system of FIGS. 1 and 2. One skilled in the art will recognize that the exemplary embodiment is only one of many alternative ways of implementing the database in accordance with the objectives of the system. The schema 52 shows a number of records as rows, the records each comprising a number of fields, shown as columns. Each of the records corresponds to a taxable good 38 (FIG. 3), and is associable to the taxable good 38 by way of the unique identifier encoded in the machine readable symbol 14 or RFID tag 30 secured to the taxable good 38.

For example, the RFID tag 30 on the bottle of distilled spirits 40 may contain a unique identifier consisting of, or including, a first serial number 54. The first serial number 54 identifies a first record 56 in the schema 52. The first record 56 contains tax information about the bottle of distilled spirits 40. For example, this first record 56 may contain a manufacturer's identification code 58 and a product code 60, identifying the manufacturer and the particular contents of the bottle of distilled spirits 40. The first record 56 may also contain an identifier 62 corresponding to a first taxing authority, a tax status code 64 corresponding to whether a tax has been paid to the first taxing authority, a tax amount 66 identifying the amount of any tax paid, and a date field 68 identifying the date that the tax payment was made to the first taxing authority. The record 56 may further have fields for identifying a second tax authority 70, a tax status field 72, a tax sum field 74 and a data field 76 for the second taxing authority. The record 56 may additionally include a field for storing an origin identifier 78, for example, to identify the country or state of origin of the taxable good 38.

As can be seen in the schema 52, a second taxable good 38 such as the cigarettes 42 may have a serial number 80 corresponding to the second record 82. From the second record 82 it can be determined that the cigarettes 42 and the distilled spirits 40 have the same manufacturer 58. A second package or carton of cigarettes would have its own unique serial number 84 corresponding to a separate record 86. In the case of an item such a yacht 50, taxes may be paid to a federal government, as well as a state government, as shown in the record 88.

Figure 5:
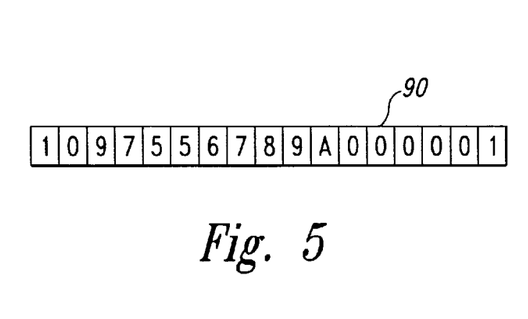
FIG. 5 is a schematic diagram showing a unique identifier comprised of a manufacturer identifier, a product identifier, and a unique serial number.
Figure 6:
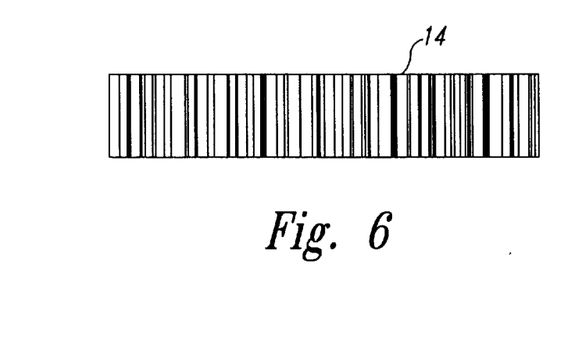
FIG. 6 shows a unique identifier in the form of a barcode symbol.

FIG. 5 shows a unique numeric or alpha-numeric identifier 90 for a taxable good 38 where the identifier employs the manufacturer code 58, the product code 60 and the unique serial number 54. The unique identifier 90 may be encoded in the RFID tag 30. Alternatively, the unique identifier may be encoded in the barcode symbol 14, as shown in FIG. 6.

Figure 7:
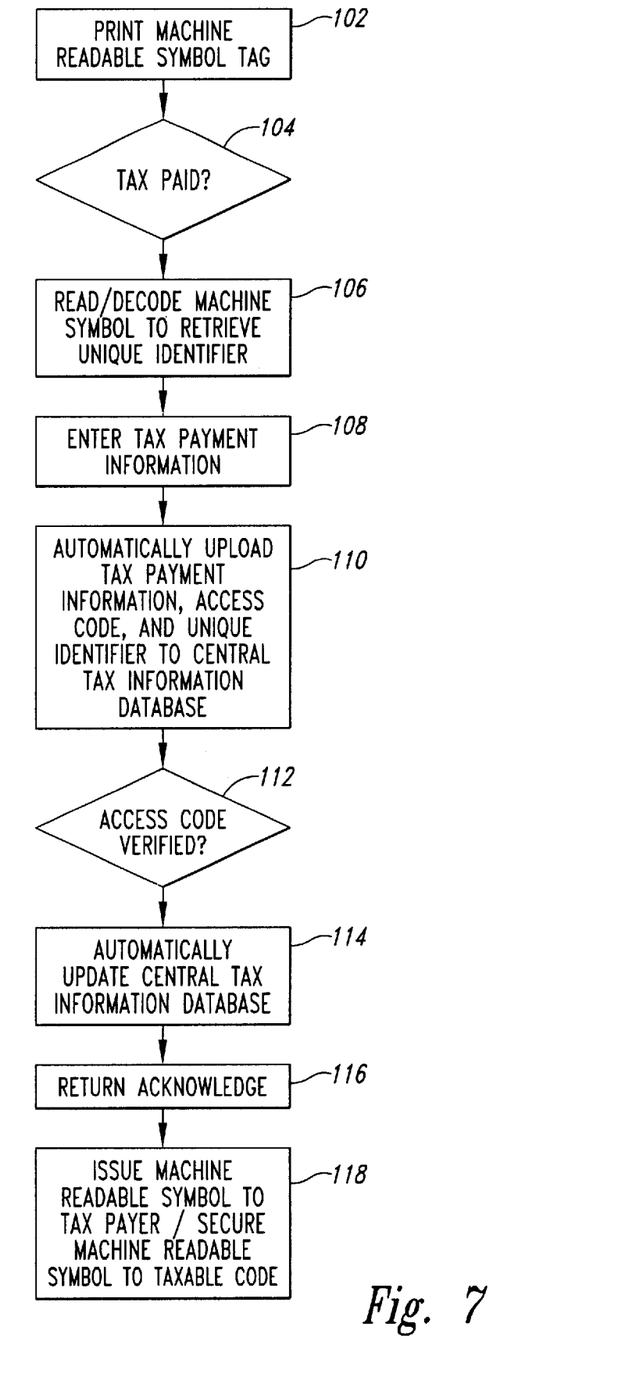
FIG. 7 is a flow chart of an exemplary method of maintaining tax payment information and issuing a tax stamp employing the structure of FIG. 1.

FIG. 7 shows an exemplary method of maintaining tax payment information and issuing a tax stamp in the form of a machine readable symbol tag 14. In step 102, the printer 96 prints a machine readable symbol 14 encoding a unique identifier onto a tag. In step 104, a user such as a tax collector determines if tax on a taxable good 38 has been paid. If the tax is to be paid, the reader 12 reads or scans the machine readable symbol 14 and decodes the machine readable symbol 14 to retrieve the unique identifier, in step 106. The user manually enters permanent tax payment information, such as the amount of tax paid into the reader 12 in step 108. Step 108 may also include the automatic entry of certain tax information into the reader 12. For example, the reader may automatically keep track of the current date. The reader may also rely on a second machine readable symbol on the taxable good, such as a UPC code symbol to automatically identify the manufacturer and product code for the taxable good 38. Additionally, the reader 12 may automatically enter an identification code for the taxing authority.

In step 110, the reader automatically uploads the tax payment information and the unique identifier to the central tax information database 18 by way of the personal computer 20, the communications link 16 and the central computer 24. The reader 12 or the personal computer 20 may provide an access code to the central computer 24 along with the tax payment information.

In step 112, the central computer 24 verifies the access code before automatically updating the central tax information database in step 114 with the uploaded tax payment information based on the unique identifier. In optional step 116, the central computer 24 may provide a return acknowledgement to the personal computer 20 by way of the communications link 16. The acknowledgement may indicate to the user or tax collector that the update process has been successfully completed. Upon receiving the return acknowledgement, the user may issue the machine readable symbol tag to the tax payer, and the tag may be secured to the taxable good 38.

Figure 8:
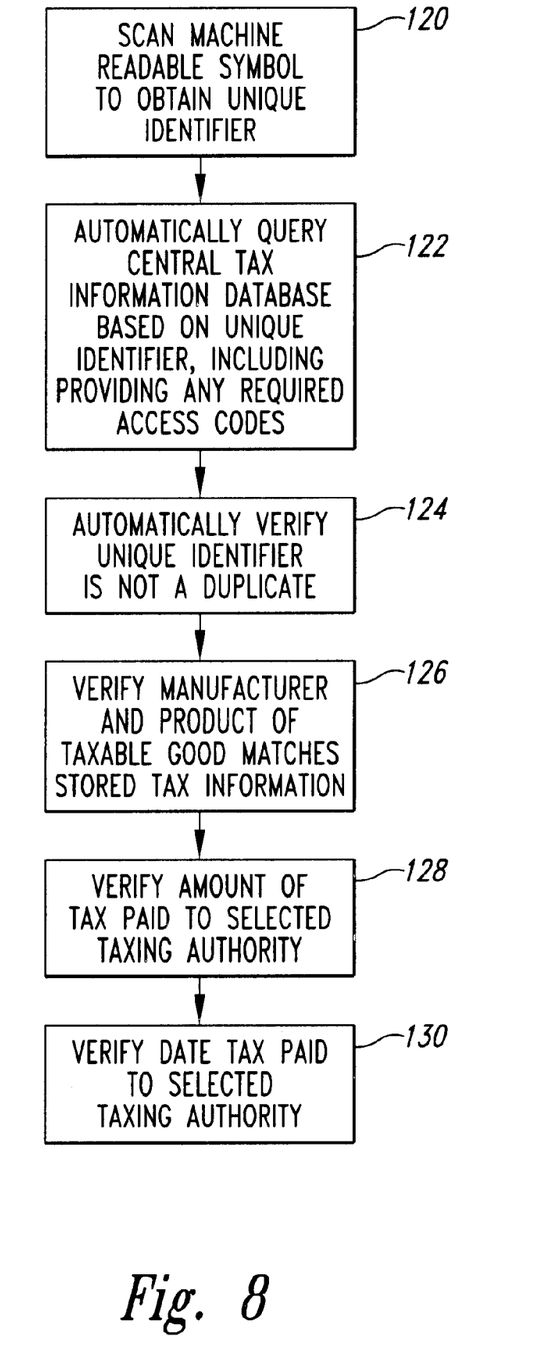
FIG. 8 is a flow chart of an exemplary method of verifying the payment of taxes employing the structure of FIG. 1.

FIG. 8 shows an exemplary method of verifying the payment of taxes on a taxable item or good 38. In step 120, the reader 12 scans the machine-readable symbol on the taxable good 38 to obtain the unique identifier. In step 122, the reader 12 and/or the personal computer 20 automatically queries the central tax information through the central computer 24 database 18 using the unique identifier as a key. The reader 12 or personal computer 20 may also provide the central computer with any required access codes.

In step 124, the computer 24 automatically verifies that the unique identifier is not a duplicate. This step helps to ensure that forged machine-readable symbols 14 are not being used. In step 126, the manufacturer and product code of the taxable good is verified against the information stored in the central tax information database 18. In one exemplary embodiment, the central computer 24 downloads the manufacturer and product identifiers from the central tax information database 18 to the reader 12. The tax collector then verifies the information against the taxable good 38. This may be accomplished by sight, or by comparing the downloaded information with information retrieved from a UPC code symbol on the good 38. In an alternative exemplary embodiment, the reader 12 may upload identifying information, such as the manufacturer and product code, to the computer 24 for automatic verification. For example, a UPC code symbol on the product may be automatically scanned in addition to scanning the machine-readable symbol 14.

In optional step 128, the amount of tax paid is stored in the central database 18 and is verified against the taxable good 38. For example, if the taxable good is distilled spirits 40, a flat rate tax may apply based on the volume of spirits.

The tax collector may easily verify the amount paid versus the quantity. Alternatively, the reader may scan a label on the bottle of distilled spirits 40 to determine the volume or quantity and to automatically provide the volume or quantity to the personal computer 20 or central computer 24 for automatic verification.

In step 130, the date that the tax was paid may be verified. This may be particularly important, where taxes on the item are to be periodically paid, for example, the yacht 50. Verification of the date may be automatic, the reader 12, the computer 20, or the central computer 24 automatically supplying the current date and comparing the current date to the tax payment date stored in the central tax information database 18.

Figure 9:
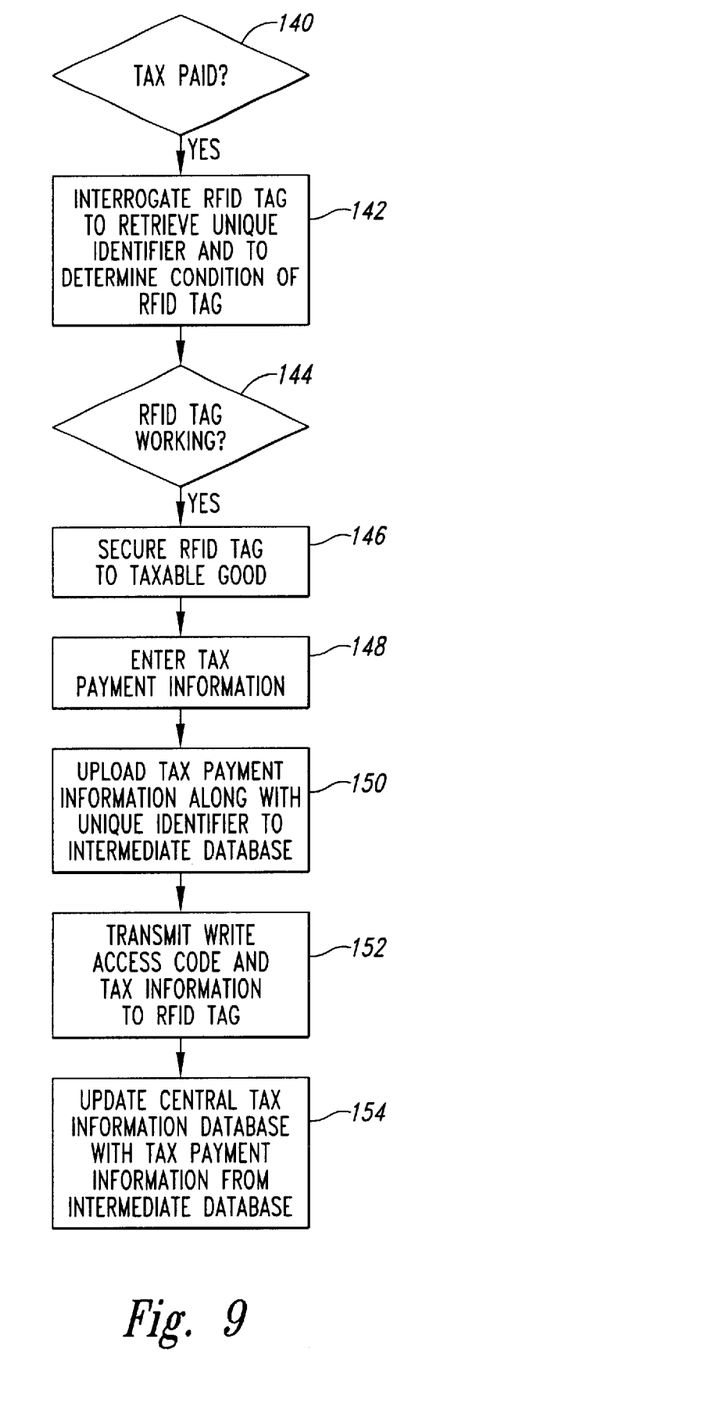
FIG. 9 is a flow chart of an exemplary method of maintaining tax payment information employing the structure of FIG. 2.

FIG. 9 shows an exemplary method of maintaining tax payment information employing the RFID tag 30 in the verification system of FIG. 2. In step 140, the user or tax collector determines if a tax has been paid. If the tax has been paid, then in step 142, the interrogator 28 interrogates the RFID tag 30 to retrieve the unique identifier. The interrogator 28 may also determine the working condition of the RFID tag 30. This may be of particular concern where the RFID tag 30 is exposed to harsh environments and rough handling leading to damage.

If the RFID tag 30 is in working condition, the RFID tag 30 is secured to the taxable good 38, in step 146. In step 148, tax payment information is entered into the interrogator 28. Tax payment information may be entered by hand by the user and/or may be automatically entered. For example, a UPC code symbol on the taxable good 38 may be scanned using the reader 12 or a similar reader built into the interrogator 28.

In step 150, the interrogator 28 uploads the tax payment information along with unique identifier to the intermediate database 36, by way of the RF transceiver 34 and personal computer 20. In optional step 152, the interrogator 28 may transmit a write access code and tax information to the RFID tag 30 to store the tax information therein. Requiring a write access code prevents tampering with information in the RFID tag 30. The storage of certain tax information in the RFID tag 30 may prove convenient for applications where there is no immediate access to the intermediate database 36 or the central tax information database 18.

Periodically, the personal computer 20 uploads the tax payment information from the intermediate database 36 to the central computer 24 for updating the central tax payment information database 18. This alleviates the need for a continuous communications link between the personal computer 20 and the computer 24.

Figure 10:
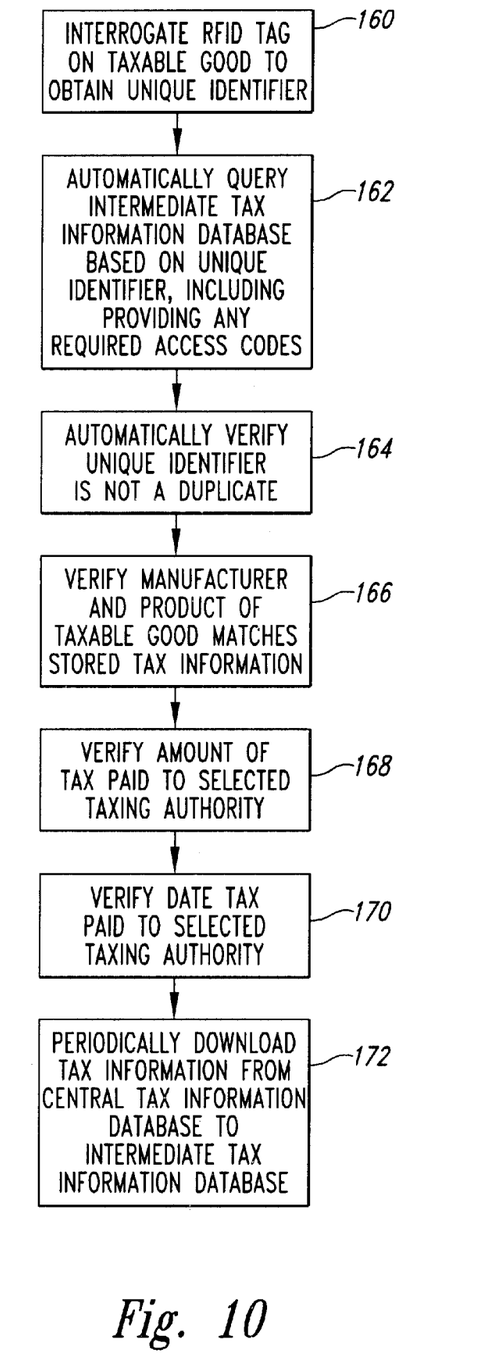
FIG. 10 is a flow chart of an exemplary method of verifying tax compliance employing the structure of FIG. 2.

FIG. 10 shows an exemplary method of verifying compliance with tax laws employing the RFID tag 30 and the system 26 of FIG. 2. In step 160, the interrogator 28 interrogates the RFID tag 30 on the taxable good 38 to obtain the unique identifier. In step 162, the interrogator 28, or personal computer 20, interrogates the intermediate tax information database 36 based on the unique identifier. The interrogator 28 or personal computer 20 provides any required access codes.

In step 164, the personal computer 20 verifies that the supplied unique identifier is not a duplicate to detect forgery attempts. In step 166, the user or the personal computer 20 verifies that the manufacturer and product code of the taxable good matches the manufacturer and product code stored in the intermediate tax information database 36, similar to step 126. In step 168, the amount of tax paid is verified in a fashion similar to step 128 of FIG. 8. In step 170, the tax payment date is verified in a fashion similar to step 130 of FIG. 8.

In step 172, the tax information stored in the central tax information database 18 is periodically downloaded to the intermediate tax information database 36. This permits data collected from a wide variety of sources, such as multiple interrogators 28, or readers 12, to be routinely supplied to the intermediate database 36 without requiring a continuous communications link 16.

An example employing the method of FIG. 10 and the apparatus of FIG. 2 will now be discussed. Many people travel abroad and return with items they purchased while out of the country and for which a duty applies. Often, they will return by car and will be stopped at a border checkpoint and questioned about the items that they have purchased or required to submit a written declaration. The system 26 of FIG. 2 may automatically verify compliance with tax laws where all duty items are required to carry a wireless memory device, such as the RFID tag 30.

Each border checkpoint may include a number of antennas positioned to interrogate the entire volume occupied by an entering vehicle. While the customs officer inquires about duty items or examines a declaration, the interrogators may perform a complete check of the contents of the vehicle for items on which duty is due. Compliance may then be verified, and any duties owing may be collected.

Upon collection of any duties, the intermediate database 36 and/or the central tax information database 18 may be automatically updated to reflect the paid duty. Similarly, where a programmable RFID tag 30 is employed, the RFID tag 30 may be automatically updated to reflect the payment of the duty. In this way, taxing authorities avoid the loss of tax revenue, increase compliance with tax laws, and improve efficiency at border checkpoints.

Although specific embodiments of, and examples for, the invention are described herein for illustrative purposes, various equivalent modifications can be made without deviating from the spirit and scope of the invention, as will be recognized by those skilled in the relevant art. The teachings provided herein of the invention can be applied to other machine-readable symbols and wireless memory tags, not necessarily the exemplary bar code symbols and RFID tags described above. Likewise, the system may employ other computers, databases and communications links than those described in the exemplary embodiment. The system may keep track of tax information regardless of which point in the distribution system the tax is paid. For example, the tax information may concern collection of tax from one or more of the manufacturer, wholesaler, retailer, and consumer.

These and other changes can be made to the invention in light of the above detailed description. In general, in the following claims, the terms used should not be construed to limit the invention to the specific embodiments disclosed in the specification and the claims, but should be construed to include all apparatus that operate in accordance with the claims to provide a tax verification system and method of operating such system. Accordingly, the invention is not limited by the disclosure, but instead its scope is to be determined entirely by the following claims.

We claim:

1. A method of tracking tax payment information for taxable items, the method comprising:

affixing a respective wireless memory device having a computer-readable memory to each of the taxable items; and storing a tax payment status for each of the items in respective ones of the computer readable memories.

2. The method of tracking tax payment information of claim 1, further comprising:

affixing a respective unique machine-readable identifier to each of the taxable items;

reading the unique machine-readable identifier from one of the taxable items; and retrieving the tax payment status for the item using the read unique machine-readable identifier.

3. The method of tracking tax payment information of claim 2 wherein reading the unique machine-readable identifier from one of the taxable items comprises:

reading a machine-readable symbol encoding the unique machine-readable identifier.

4. The method of tracking tax payment information of claim 2 wherein reading the unique machine-readable identifier from one of the taxable items comprises:

imaging a bar code symbol encoding the unique machine-readable identifier; and decoding the imaged bar code symbol.

5. A method of tracking tax information, comprising:

for each of a number of items, securing a respective computer readable memory to the item; and for at least one of the items, automatically storing information concerning payment of tax on the item in the respective computer readable memory, wherein the tax payment information is associable with the item through the unique identifier of the item.

6. The method of tracking tax information of claim 5 wherein associating each of a number of items with a respective unique identifier comprises:

affixing a machine-readable symbol encoding the unique identifier to each of the items.

7. The method of tracking tax information of claim 5 wherein automatically storing information concerning payment of tax on the item in a computer readable memory comprises:

automatically storing a tax payment condition.

8. The method of tracking tax information of claim 5 wherein automatically storing information concerning payment of tax on the item in a computer readable memory comprises:

automatically storing a tax payment sum.

9. The method of tracking tax information of claim 5 wherein automatically storing information concerning payment of tax on the item in a computer readable memory comprises:

automatically storing a tax payment condition; and automatically storing a tax payment locality.

10. The method of tracking tax information of claim 5 wherein automatically storing information concerning payment of tax on the item in a computer readable memory comprises:

automatically storing a tax payment condition; and automatically storing a product type identifier.

11. The method of tracking tax information of claim 5 wherein automatically storing information concerning payment of tax on the item in a computer readable memory comprises:

automatically storing a tax payment condition; and automatically storing a product origin identifier.

12. The method of tracking tax information of claim 5 wherein automatically storing information concerning payment of tax on the item in a computer readable memory comprises:

automatically storing a tax payment condition;

automatically storing a tax payment locality; and automatically storing a date corresponding to a date a tax payment for the item was made.

13. The method of tracking tax information of claim 5 wherein automatically storing information concerning payment of tax on the item in a computer readable memory comprises:

automatically storing a first tax payment condition for a first tax collecting authority; and automatically storing a second tax payment condition for a second tax collecting authority.

14. The method of tracking tax information of claim 5 wherein the computer readable memory comprises an RF memory tag and automatically storing information concerning payment of tax on the item in the respective computer readable memory comprises:

automatically storing a tax payment condition in an RF memory tag.

15. The method of tracking tax information of claim 5 wherein the computer readable memory comprises an RF memory tag and the automatically storing information concerning payment of tax on the item in the respective computer readable memory comprises:

transmitting an access code to an RF memory device; and automatically storing a tax payment condition in an RF memory tag.

16. A method of tracking tax information, comprising:

securing a wireless programmable memory device to an item;

collecting a tax for the item; and updating tax information in the memory device after collecting the tax on the item.

17. The method of claim 16, further comprising:

transmitting a security code to the memory device prior to updating the tax information.

18. The method of claim 16, further comprising:

programming a unique identifier in the memory device.

19. The method of claim 16, further comprising:

permanently programming a unique identifier in the memory device.

20. The method of claim 16, further comprising:

programming a unique identifier in the memory device; and updating a computer readable memory separate from the memory device with the unique identifier and the tax information.

* * * * *